(12) United States Patent
Taghizadeh Kaschani

(10) Patent No.: US 8,830,640 B2
(45) Date of Patent: Sep. 9, 2014

(54) ELECTROSTATIC DISCHARGE PROTECTION CIRCUIT

(75) Inventor: Karim T. Taghizadeh Kaschani, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 80 days.

(21) Appl. No.: 13/529,018

(22) Filed: Jun. 21, 2012

(65) Prior Publication Data

US 2013/0342940 A1     Dec. 26, 2013

(51) Int. Cl.
*H01H 9/00*      (2006.01)
(52) U.S. Cl.
USPC .......................................................... 361/56
(58) Field of Classification Search
CPC   H01H 9/046; H01L 27/0251; H01L 27/0266; H01L 27/027
USPC .......................................................... 361/56
See application file for complete search history.

(56) References Cited

U.S. PATENT DOCUMENTS

| 5,162,966 | A | * | 11/1992 | Fujihira | 257/140 |
| 5,416,351 | A | * | 5/1995 | Ito et al. | 257/357 |
| 6,351,362 | B1 | * | 2/2002 | Inoue et al. | 361/111 |

FOREIGN PATENT DOCUMENTS

JP        2003037493 A  *  2/2003

OTHER PUBLICATIONS

"ESD in Silicon Integrated Circuits", John Wiley & Sons, Chichester (England), 2002, p. 148.

* cited by examiner

*Primary Examiner* — Scott Bauer
(74) *Attorney, Agent, or Firm* — Alan A. R. Cooper; Frederick J. Telecky, Jr.

(57) ABSTRACT

Electronic device comprising an electronic circuit and an ESD protection circuit is provided. The ESD protection circuit comprises a first and a second protection stage, wherein the second protection stage comprises at least one high side CMOS-transistor and a low side CMOS-transistor acting as power dissipating rail clamps. The at least one high side CMOS-transistor and the low side CMOS-transistor are coupled so as to provide an anti-series connection of Zener diodes between a node of the electronic device and a supply voltage rail. Further, the high side CMOS-transistors and the low side CMOS-transistor are complementary CMOS-transistors.

19 Claims, 3 Drawing Sheets

ELECTROSTATIC DISCHARGE PROTECTION CIRCUIT

FIELD OF THE INVENTION

The invention relates to an electrostatic discharge protection circuit for failsafe protection of the integrated circuit.

BACKGROUND

Unbalanced electrostatic charge may cause an electrostatic discharge (ESD) if the electrical charge is balanced uncontrolled and fast. For integrated circuits (ICs), an ESD may have significant impact on product quality and production yields. The discharge current of an ESD event may damage or destroy gate oxides, junctions and metallization of ICs. For example, an ESD may occur by a charged body touching an IC or a charged IC touching a grounded surface.

The major ESD models, which are widely used in the industry to model the effect of ESD on ICs, are the human-body model (HBM) and the charge device model (CDM). The HBM simulates the discharge of a charged human body as the human touches a grounded IC. While the stress of an HBM ESD event is mainly determined by the charge that the human body has acquired, the duration of an HBM ESD event is mainly defined by the impedance of the human body. The CDM simulates charging and discharging events that occur in the production equipment and process. A CDM ESD event may occur if there is metal to metal contact in manufacturing. For example, the CDM ESD may occur if a device slides down a shipping tube and hits a metal surface. The CDM addresses the possibility that a charge may reside on the lead frame or package and may discharge through a pin of the electronic device which is grounded. The discharge current will be limited by the parasitic impedance and capacitance of the device only. As a result, a CDM ESD event is much shorter than a HBM ESD event. Since, it may take only one single ESD strike to permanently damage a product, ESD protection is a critical aspect of the design of an electronic device. ESD protection circuits are; for example, known from A. Amerasekera, C. Duvvury, "ESD in Silicon Integrated Circuits", John Wiley & Sons, Chichester (England), 2002, page 148.

The most simple protection strategy of an input pin is a single stage ESD protection circuit. However, this is less effective than a double stage ESD protection. A secondary stage in the two stage ESD protection circuit, especially, functions to protect sensitive components (e.g. the gate oxide of an input buffer). The secondary protection stage is coupled to the primary protection stage by means of a current limiting component (e.g. a resistor). By limitation of the ESD current that has to be conducted by the secondary protection stage, the ESD induced voltage drop across the secondary protection stage becomes much smaller than the corresponding voltage drop across the first protection stage. This is the reason why a double stage ESD protection is more effective than a single stage ESD protection. Two stage ESD protection circuits may be rather complex in particular for distributed protection stages having the primary and secondary protection stage spaced apart in the IC layout. For optimum performance, the primary protection elements are directly connected to the pin of the IC and the secondary protection elements are placed as close as possible to the component or to a circuit to be protected.

FIG. 1 is a simplified circuit diagram showing an ESD protection circuit, comprising a primary protection stage P1 and a secondary protection stage P2 for protecting an integrated circuit IC against ESD events. Both, the primary protection stage P1 and the secondary protection stage P2 are coupled to a positive supply rail VDD and to a negative supply rail VSS. Both rails are further protected from ESD by the power clamp EPC, which is coupled to the positive supply rail VDD and the negative supply rail VSS. By way of an example only, the input pin IN should be protected. The input pin IN is coupled to a first node S1. A pair of primary rail clamp diodes EHP, ELP is coupled to the first node S1 and to the positive and negative supply rail VDD, VSS, respectively. The primary rail clamp diodes EHP, ELP divert the ESD current that is forced into the IN pad to the power rail VDD, where it is shunted to the power rail VSS by the power clamp EPC. While the voltage difference between the first node S1 and the positive supply rail VDD is indicated by voltage VHP and the voltage difference between the positive power supply rail VDD and the negative power supply rail VSS is indicated by the voltage VPC, the resulting voltage difference between the first node S1 and the negative power supply rail VSS is indicated by the voltage VLP. The first node S1 is decoupled from a second node S2 by a current limiting resistor RS leading to a voltage drop from the first node S1 to the second node S2 of VRS. The remaining voltage drops across both secondary rail clamp diodes EHS, ELS, wherein the voltage between the secondary node S2 and the positive supply rail VDD and the negative supply rail VSS is VHS and VLS, respectively. Due to the current limitation by the resistor RS, the voltages VHS and VLS are much smaller than the corresponding voltages VHP and VLP respectively. Furthermore, the secondary protection elements EHS, ELS can be sized much smaller than the primary protection elements EHP, ELP. If a technology is lacking dedicated diodes, parasitic diodes or other components may be used instead. Double stage ESD protection as shown in FIG. 1 is effective for both HBM ESD protection and CDM ESD protection.

Protection stages comprising a current limiting resistor RS and small protection elements are also used for CDM ESD protection of IC sub circuits or units that have a common signal interface but are supplied by different power supplies. In FIG. 2, there is a simplified circuit diagram showing on an integrated circuit (IC) comprising a first sub circuit SC1 and a second sub circuit SC2. Further, here is a CDM ESD protection stage between the two sub circuits SC1, SC2. FIG. 2 illustrates the principle of ESD protection in an IC having for example a first and a second sub circuit SC1, SC2. By way of an example only, the first sub circuit SC1 is coupled to a first positive supply rail VDD1 and to the common negative supply rail VSS. The output OUT of the first sub circuit SC1 is coupled to the node S2 via the current limiting resistor RS. The second sub circuit SC2 is coupled to a second positive supply rail VDD2, which provides a different supply voltage when compared to the first positive supply rail VDD1. Further, the second sub circuit SC2 is coupled to the common negative supply rail VSS and an input IN of the second sub circuit SC2 is coupled to the node S2.

In order to protect the input IN pin of the second sub circuit SC2 from CDM ESD, the diodes EHS and ELS are connected between node S2 and the positive and negative supply rail VDD2 and VSS, respectively. For optimum performance, the diodes EHS and ELS are placed as close as possible to the input node IN of the second sub circuit SC2 to be protected. If a technology is lacking dedicated diodes, parasitic diodes or other components may be used instead.

Generally speaking, a system is denoted failsafe if failure of any of its components does not cause the complete system to fail. FIG. 3 is a simplified block diagram showing a first integrated circuit or sub circuit (IC1) and a second integrated circuit or sub circuit (IC2) which are both coupled to a common positive supply rail VDD and which are coupled to each other via the nodes OUT and IN. The characteristic "failsafe" or "non-failsafe" can also be applied to ICs and IC pins. An IC node, for example the input node IN of IC2 is denoted "failsafe" if a failure of IC2 does not cause an external component which is connected to the node to fail as well. By way of an example, the input IN of IC2 is not failsafe because it is connected via an internal diode (shown in dashed line) to the supply connecting IC2 to VDD. If the power supply of IC2 fails while the power of IC1 is still maintained, IC2 is indirectly supplied by current that is flowing from IC1 across the internal diode of IC2 to its supply VDD. This current path is drawn in FIG. 2. However, since this parasitic current path was not intended to supply IC2, it may lead to malfunction of IC1 or IC2 or may even cause damage of the ICs.

This problem is even more pronounced if IC1 is supplied by a higher supply voltage than IC2. In this case, IC2 is required to have a voltage tolerant input node IN, in order to avoid large cross currents to flow from the supply of IC1 via its output OUT to the input IN of IC2 and to the supply of IC2.

To avoid malfunction of IC1 and IC2, the input IN of IC2 has to be failsafe. With respect to an ESD protection of IN, this can be established by a primary protection between the input IN and the common supply VSS and a failsafe secondary protection.

The characteristic "failsafe" or "non-failsafe" may also be applied to different sub circuits of a single integrated circuit (IC). Again, reference is made to the example shown in FIG. 2. The input IN of the second sub circuit SC2 is not failsafe because it is connected to the second power supply rail VDD2 via the diode EHS. If the power supply of the second sub circuit SC2 fails while the first power supply VDD1 of the first sub circuit SC1 is still maintained, the second sub circuit SC2 is indirectly supplied by a current that flows from the first sub circuit SC1 across the resistor RS and the diode EHS to the supply VDD2 of SC2.

However, since this parasitic current path was not intended to supply the second sub circuit SC2, it may lead to malfunction of SC1 or SC2 or may even cause damage of the sub circuits SC1, SC2. A similar problem occurs, if the first sub circuit SC1 is supplied by a higher supply voltage than SC2 (i.e. VDD1>VDD2). In this case, the second sub circuit SC2 is required to have a voltage tolerant CDM protection connected to its input IN, in order to avoid permanent cross currents to flow from the first supply rail VDD1 of SC1 via its output OUT to the input IN of the second sub circuit SC2 and to its second supply rail VDD2.

SUMMARY

It is an object of the invention to provide an electronic device comprising an electrostatic discharge protection circuit having a small layout size, a low capacitive load and which provides robust and failsafe ESD protection.

According to an aspect of the invention, an electronic device comprising at least one integrated circuit and an electronic discharge (ESD) protection circuit for failsafe protection of the at least one integrated circuit is provided. The ESD protection circuit comprises a primary protection stage comprising primary power dissipating rail clamps and a subsequent, secondary protection stage. Further, the ESD protection circuit comprises a current limiting resistor for decoupling the primary and the secondary protection stage. The primary protection stage and the secondary protection stage are coupled via a current limiting resistor. According to an embodiment of the invention, the two stage ESD protection circuits may be spaced apart in an IC layout. For example, the primary protection elements may be directly connected to a pin of the electronic device and the secondary protection stage may be placed as close as possible to the integrated circuit, semiconductor device, component or circuit which should be protected. In another embodiment of the invention, the electronic device comprises a first and a second integrated circuit, for example sub circuits. The ESD protection circuit may be coupled between this first and second integrated (sub) circuit so as to provide a failsafe electronic device. An input of the ESD protection circuit may be coupled to the first integrated (sub) circuit and an output of the ESD protection circuit may be coupled to the second integrated (sub) circuit.

According to aspects of the invention, a first primary power dissipating clamp is coupled in series between a first supply voltage rail of the electronic device and an input node of the ESD protection circuit and a second primary power dissipating clamp is coupled in series between a second supply voltage rail of the electronic device and the input node of the ESD protection circuit. Further, the protective resistor is coupled in series between the input and the output of the ESD protection circuit.

The secondary protection stage of the ESD protection circuit, according to aspects of the invention, comprises at least one high side CMOS-transistor which is coupled between the output and the first supply. This high side CMOS-transistor acts as a first rail clamp. Further, there is a low side CMOS-transistor which is coupled between the output and the second supply voltage of the electronic device. The low side CMOS-transistor acts as a second rail clamp. The at least one high side CMOS-transistor and the low side CMOS-transistor are coupled so as to provide an anti-series connection of Zener diodes between the second node and the first supply voltage. The low side CMOS-transistor is coupled so as to provide a Zener diode which is coupled in forward direction between the output and the second supply voltage. Further, the high side CMOS-transistor(s) and the low side CMOS-transistor are complementary CMOS-transistors.

The ESD protection circuit, according to aspects of the invention, provides failsafe protection of an internal node or external pin, preferably an input pin of an electronic circuit. The first aspect is beneficial if the electronic device comprises a plurality of electronic circuits (i.e., a plurality of integrated circuits or sub circuits which are provided with an ESD protection circuit according to aspects of the invention). In particular, if the integrated sub circuits have different supply voltages, a failsafe pin or node protection is beneficial in that parasitic currents are prevented from flowing from a first node of a first integrated circuit to a second node of a second integrated circuit. This protection may be provided by the anti-series connection of Zener diodes. A break down voltage of the Zener diode configuration is high enough to prevent current flow under normal operating conditions or if the internal voltage supply fails. Further, the ESD protection circuit may be implemented in CMOS-technology which typically does not offer dedicated Zener diodes. Within the context of this specification, the term "Zener diode" oder "Zener diode characteristic" may be understood in that a device having voltage clamping (i.e. voltage limiting capability comparable to a Zener diode should be provided or implemented). In CMOS technology, the high side and low side CMOS-transistors may be configured so as to offer a voltage clamping functionality (i.e. a functionality which is typically known from a Zener diode).

According to another aspect of the invention, a source, a gate and a bulk of at least one of the high side transistors are coupled to the first supply voltage. A drain of at least one high side transistor is/are coupled to a drain of the low side transistor. A bulk of the low side transistor is coupled to the second supply voltage rail. The junction between the gate and the drain of the high side transistor(s) provide(s) voltage limiting functionality, in other words, it acts as a Zener diode.

According to another aspect of the invention, the secondary stage of the ESD protection circuit comprises a single low side transistor and a first and a second high side transistor. The channels of the first and the second high side transistor are coupled in series. A source, a gate and a bulk of the second high side transistor are coupled to the first supply voltage rail and a drain of the second high side transistor is coupled to a source and to a gate of the first high side transistor. Further, a drain of the first high side transistor and a drain of the low side transistor are coupled to the output. A source and a gate of the low side transistor are coupled to the second supply voltage rail. According to an embodiment of the invention, a bulk of the first high side transistor and a bulk of the low side transistor are coupled to the second supply voltage rail. There is no transistor which is directly connected to both, the first and the second supply voltage rail. Consequently, the risk for damage of the transistor which is due to over-voltages between the first and second supply voltage and which may exceed either the gate to bulk, source or drain or the source or drain to bulk or the source to drain breakdown voltage may be reduced. Further, since all bulk terminals (n-wells and p-wells) are connected to the voltage supply, the respective transistors may be placed into the same well as transistors of the same type. Since only the drains of the first high-side transistor and the low-side transistor are connected to the output, the capacitive load added by the second stage of the ESD protection to the second node is very small.

The second high side transistor may be PMOS transistor and is coupled to a positive supply voltage as a first supply voltage. The first high side transistor may be and NMOS transistor. Further, the low side transistor may be an NMOS transistor which is coupled to a negative supply voltage as a second supply voltage.

According to another aspect of the invention, the second stage of the ESD protection circuit comprises a single low side transistor and a single high side transistor. A source, a gate and a bulk of the high side transistor are coupled to the first supply voltage rail. A drain of the high side transistor is coupled to a source and a gate of the low side transistor. Further, a bulk of the low side transistor is coupled to the secondary supply voltage rail and the second node is coupled to a drain of the low side transistor. Further, the high side transistor may be a PMOS transistor which is coupled to a positive supply voltage as a first supply voltage. The low side transistor may be an NMOS transistor which is coupled to a negative supply voltage as a second supply voltage. According to this aspect of the invention, there is a single high side and a single low side transistor. However, the drain to bulk pn-junction of the low side transistor offers diode functionality and protection for the node.

According to still another aspect of the invention, the electronic device comprises a first integrated circuit or sub circuit and a second integrated circuit or sub circuit, wherein the input of the ESD protection circuit is coupled to the first integrated circuit or sub circuit and the output of the ESD protection circuit is coupled to the second integrated circuit.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

Figure 4:
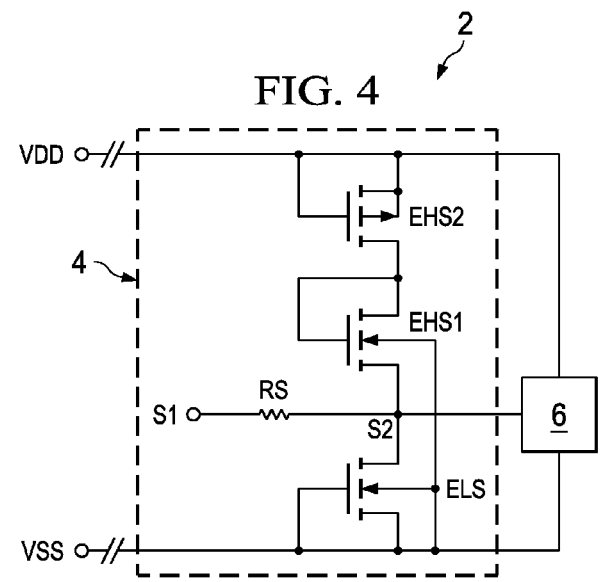
FIG. 4 is a simplified circuit diagram showing an electronic device comprising an electronic circuit and an ESD protection circuit according to an embodiment of the invention.

FIG. 4 is a simplified circuit diagram showing an electronic device 2 comprising an ESD protection circuit 4 and an electronic circuit 6, which may be for example an integrated circuit (IC), a sub unit or sub circuit of an integrated circuit or device. In FIG. 4, only a second stage of the ESD protection circuit 4 is depicted. The ESD protection circuit 4 may be connected to a primary protection stage which may be configured according to the primary protection circuit EPC1 which is exemplarily shown in FIG. 6 and to which we will refer later in more detail.

A first node 51 or input of the ESD protection stage is coupled to the primary protection stage P1. There is a protective resistor RS which is coupled between the first node 51 and a second node S2 of the secondary protection stage, wherein the second node S2 may be interpreted as an output of the ESD protection stage. The secondary stage of the ESD protection circuit 4 according to the embodiment in FIG. 4 comprises a first and a second high side CMOS-transistor EHS1, EHS2 which act as a high side and low side rail clamp of the secondary protection stage. The channel of the first and second high side CMOS-transistor EHS1, EHS2 are coupled in series between the second node S2 and the positive supply rail VDD. Preferably, the second high side transistor EHS2 is a PMOS-transistor. Preferably, the first high side transistor EHS1 and the low side CMOS-transistor ELS are NMOS-transistors. The low-side transistor ELS is coupled between the second node S2 and a negative supply voltage rail VSS. This low side CMOS-transistor acts as a low side rail clamp of the second protection stage of the ESD protection stage 4.

Figure 1:
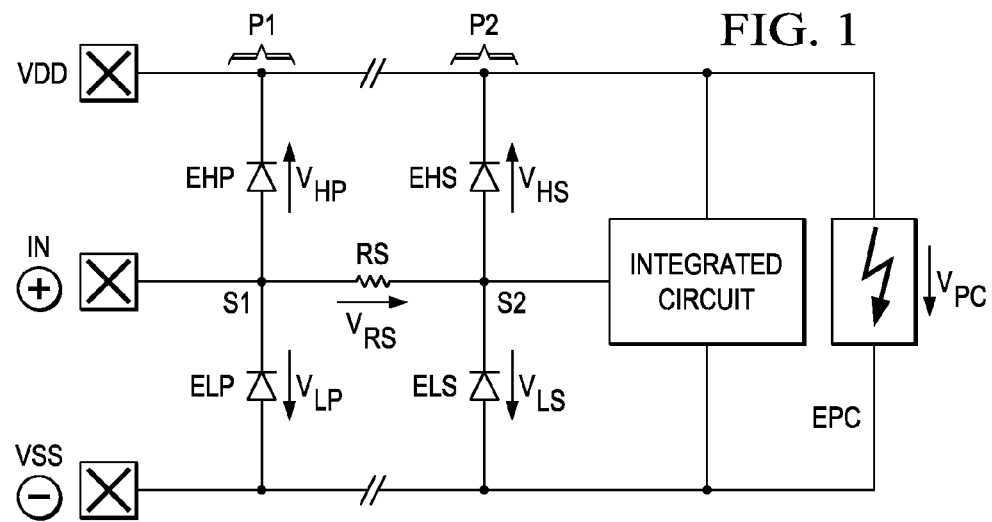
FIG. 1 is a simplified circuit diagram showing an ESD protection circuit which is coupled to an integrated circuit, according to the prior art.
Figure 2:
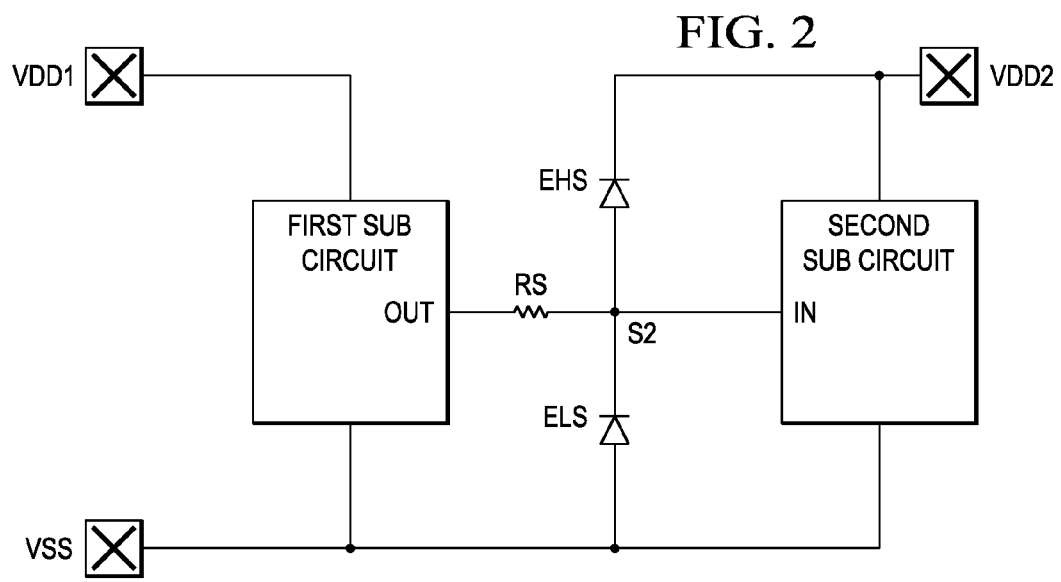
FIG. 2 is another simplified circuit diagram showing a first and a second sub circuit of an integrated circuit which are coupled via a non-failsafe CDM ESD protection, according to the prior art
Figure 3:
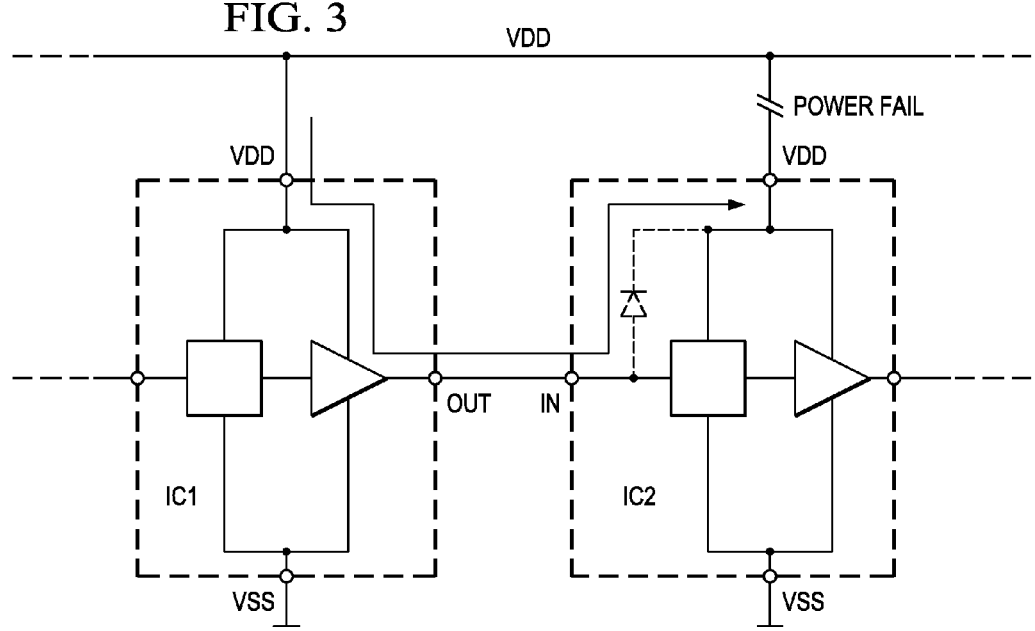
FIG. 3 is a simplified block diagram showing a first and a second integrated circuit which are coupled via non-failsafe terminals, according to the prior art.

A source, a gate and a bulk terminal (within the context of this specification also referred to as "bulk" only) of the PMOS transistor EHS2 are coupled to the positive supply voltage rail VDD. A drain of the PMOS-transistor EHS2 is coupled to a source and a gate of the high side NMOS-transistor EHS1. A drain of the high side NMOS-transistor EHS1 is coupled to the second node S2. Further, a drain of the low side NMOS-transistor is coupled to the second node S2, too. A source and a gate of the low side NMOS-transistor ELS is coupled to a negative supply voltage rail VSS. Advantageously, the bulk terminal of both NMOS-transistors EHS1 and ELS are coupled to the negative supply voltage rail VSS. Advantageously, there is no direct connection in one of the CMOS-transistors EHS1, EHS2 and ELS between the positive and negative supply voltage rail VDD, VSS. This reduces a risk for damage of the transistors which is due to over-voltages at VDD with respect to VSS. Such over-voltages may exceed the gate to bulk/source/drain breakdown voltage or the source/drain to bulk or the source to drain breakdown voltage of the CMOS transistors. Since both NMOS-transistor EHS1 and ELS share a common bulk terminal connection to the low side supply voltage rail VSS, the transistors may be placed into the same well as transistors of the same type. Since the second node S2 is only connected to the drain terminals of both NMOS transistors EHS1 and ELS, the capacitive load of the protected node of the electronic device 2 (for example the IN node of sub circuit SC2 in FIG. 3 or the IN pin in FIG. 6) is very small.

The second node S2 as well as the positive and negative supply voltage rail VDD, VSS are coupled to the electronic circuit 6 which is provided with a failsafe and highly effective ESD protection circuit 4.

Figure 5:
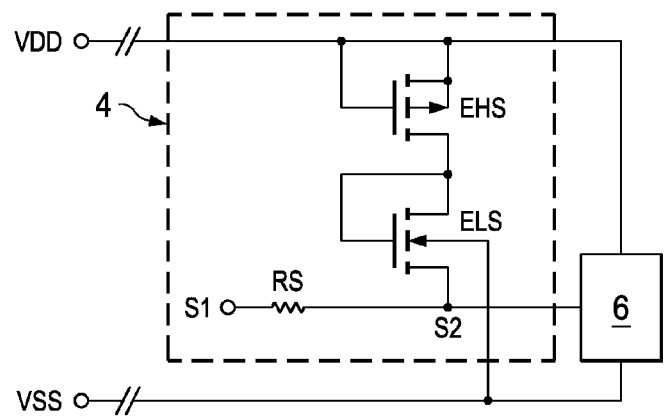
FIG. 5 is another simplified circuit diagram showing an electronic device comprising an electronic circuit and an ESD protection circuit according to another embodiment of the invention.

In FIG. 5, there is another simplified circuit diagram showing an ESD protection circuit 4 which is coupled to an electronic circuit 6. Again, FIG. 5 shows the second stage of the ESD protection circuit 4 only. The primary protection stage P1 may be configured according to the primary protection stage EPC1 in FIG. 6 which is coupled to the first node 51 which is further coupled to the second node S2 via the protective resistor RS. The secondary stage of the ESD protection circuit 4 in FIG. 5 comprises a single high side CMOS-transistor EHS, preferably a PMOS-transistor. The high side transistor EHS acts as a power dissipating rail clamp of the secondary stage. The low side CMOS-transistor ELS which preferably is an NMOS-transistor acts as a low side power dissipating clamp of the secondary stage of the ESD circuit 4. To be more precise, the drain to bulk pn-junction of the low side PMOS-transistor ELS provides the functionality of a low side power dissipating clamp.

The high side PMOS-transistor EHS is coupled to the positive supply voltage rail VDD via source, bulk and gate. The drain of the high side PMOS-transistor EHS is coupled to a source and to a gate of the low side NMOS-transistor ELS. The drain of the low side NMOS-transistor ELS is coupled to the second node S2. The bulk terminal of the low side NMOS-transistor ELS is coupled to the negative supply voltage rail VSS. When comparing the embodiment of FIG. 5 with the embodiment of FIG. 4, it might be noticed that the low side NMOS-transistor ELS is configured analogously to the high side NMOS-transistor in the embodiment of FIG. 4. In other words, the low side NMOS-transistor ELS in FIG. 4 is left out in the embodiment of FIG. 5. The low side transistor ELS in the embodiment of FIG. 4 is dispensable since the drain to bulk pn-junction of the low side PMOS-transistor ELS in the embodiment of FIG. 5 offers the same protection for the second node S2. There is a diode connection between the second node S2 and the negative supply voltage rail VSS. Accordingly, the electronic circuit 6 which is coupled to the second node S2 and to the positive and negative supply voltage rail VDD, VSS is provided with an ESD protection circuit 4 having a very small footprint.

Figure 6:
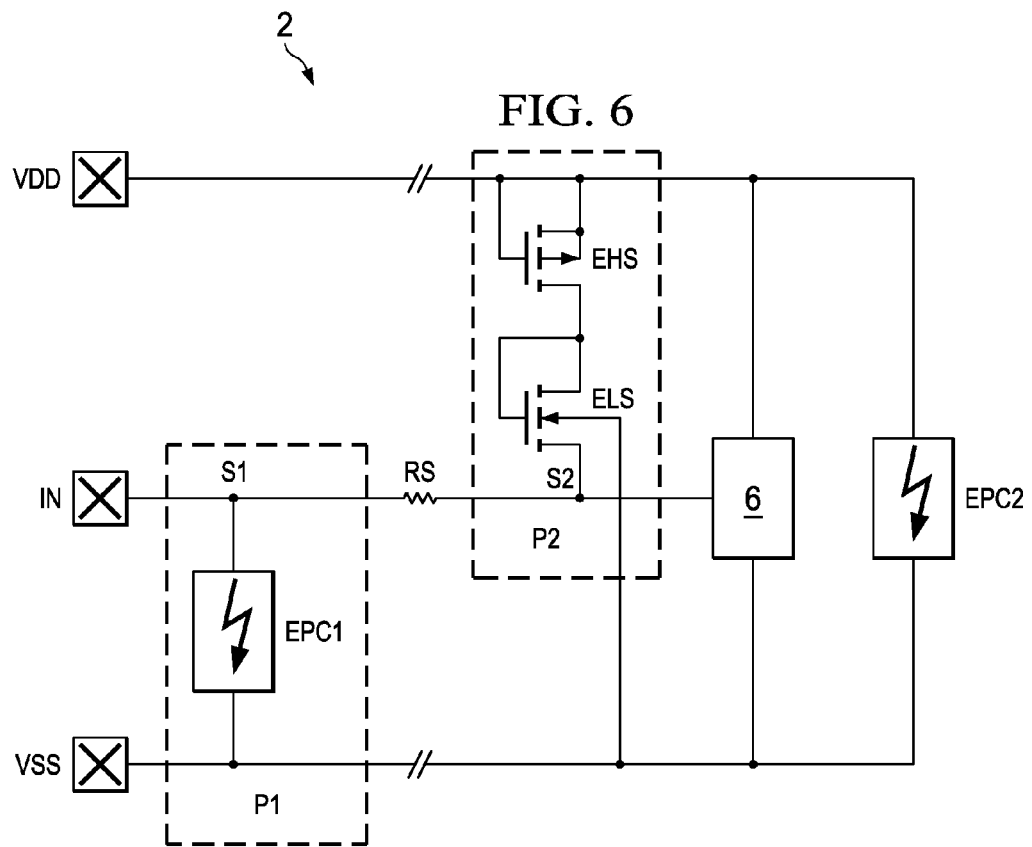
FIG. 6 is a simplified circuit diagram showing a failsafe double stage ESD protection circuit according to an embodiment of the invention.

In FIG. 6, there is another simplified circuit diagram of an electronic device 2. The electronic device 2 is coupled to a positive supply voltage VDD and to a negative supply voltage VSS. Further, there is an ESD protected input pin N. A primary protection stage EPC1 is coupled between the first node S1 and the negative supply voltage rail VSS. This primary protection stage ESC1 diverts the ESD current that is forced into the input pin IN to the power rail VSS. Further, there is ESD of the supply rails VDD and VSS due to the presence of EPC2.

Further, there is a secondary protection stage P2 comprising a single high side CMOS-transistor EHS, preferably a PMOS-transistor, which acts as a power dissipating rail clamp of the secondary stage. Further, there is a low side CMOS-transistor ELS which preferably is an NMOS-transistor and acts as a low side power dissipating clamp of the secondary stage P2 of the ESD circuit. To be more precise, the drain to bulk pn-junction of the low side PMOS-transistor ELS provides the functionality of a low side power dissipating clamp. The two stage ESD protection circuit provides effective failsafe protection of the integrated circuit 6.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An electronic device comprising at least one integrated circuit (IC) and an electrostatic discharge (ESD) protection circuit for failsafe protection of the at least one integrated circuit (IC), the ESD protection circuit comprising:
   a primary protection stage having primary power dissipating clamps and a subsequent, secondary protection stage which is coupled to the primary protection stage via a current limiting resistor, wherein
   a first primary power dissipating clamp is coupled in series between a first supply voltage of the electronic device and an input of the ESD protection circuit and a second primary power dissipating clamp is coupled in series between a second supply voltage of the electronic device and the input of the ESD protection circuit,
   the protective resistor is coupled in series between the input node and an output node of the ESD protection circuit,
   and wherein, the secondary protection stage, comprises:
      at least one high side CMOS-transistor, which is coupled between the output and the first supply voltage and acts as a first secondary rail clamp and
      a low side CMOS-transistor, which is coupled between the output and the second supply voltage and acts as a second secondary rail clamp, wherein
      the at least one high side CMOS-transistor and the low side CMOS-transistor are coupled so as to provide an anti-series connection of Zener diodes between the output node and the first supply voltage and wherein;
   the low side CMOS-transistor is coupled so as to provide a Zener diode, which is coupled in forward direction between the output and the second supply voltage and
   the high side CMOS-transistor(s) and the low side CMOS-transistor are complementary CMOS-transistors,
   wherein a source, a gate and a bulk of at least one of the high side transistors are coupled substantially directly to the first supply voltage;
   wherein a drain of the at least one high side transistor is/are coupled substantially directly to a drain of the low side transistor,
   wherein a bulk of the low side transistor is substantially directed coupled to the second supply voltage, and
   wherein the gate of the low side transistor is substantially directly coupled to its own drain.

2. The electronic device according to claim 1, wherein the secondary stage comprises a single low side transistor and a first and a second high side transistor, wherein the channels of the first and the second high side transistor are coupled in series, and wherein a source, a gate and a bulk of the second high side transistor are coupled to the first supply voltage and a drain of the second high side transistor is coupled to a source and a gate of the first high side transistor, and wherein a drain of the first high side transistor and a drain of the low side transistor are coupled to the output, and wherein a source and a gate of the low side transistor are coupled to the second supply voltage.

3. The electronic device according to claim 2, wherein a bulk of the first high side transistor and a bulk of the low side transistor a coupled to the second supply voltage.

4. The electronic device according to claim 2, wherein the second high side transistor is a PMOS transistor and is coupled to a positive supply voltage as a first supply voltage, the first high side transistor is an NMOS transistor and the low side transistor is an NMOS transistor and is coupled to a negative supply voltage as a second supply voltage.

5. The electronic device according to claim 1, wherein the secondary stage comprises a single high side transistor and a single low side transistor, wherein a source, a gate and a bulk of the high side transistor are coupled to the first supply voltage and a drain of the high side transistor is coupled to a source and a gate of the low side transistor, and wherein a bulk of the low side transistor is coupled to the second supply voltage and the output node is coupled to a drain of the low side transistor.

6. The electronic device according to claim 5, wherein the high side transistor is a PMOS transistor which is coupled to a positive supply voltage as a first supply voltage and the low side transistor is an NMOS transistor which is coupled to a negative supply voltage as a second supply voltage.

7. The electronic device according to claim 6, comprising a first integrated circuit or sub circuit and a second integrated circuit or sub circuit, wherein the input of the ESD protection circuit is coupled to the first integrated circuit or sub circuit and the output of the ESD protection circuit is coupled to the second integrated circuit.

8. An electronic device comprising at least one integrated circuit (IC) and an electrostatic discharge (ESD) protection circuit for failsafe protection of the at least one integrated circuit (IC), the ESD protection circuit comprising:
a primary protection stage having primary power dissipating clamps and a subsequent, secondary protection stage which is coupled to the primary protection stage via a current limiting resistor, wherein
a first primary power dissipating clamp is coupled in series between a first supply voltage of the electronic device and an input of the ESD protection circuit and a second primary power dissipating clamp is coupled in series between a second supply voltage of the electronic device and the input of the ESD protection circuit,
the protective resistor is coupled in series between the input node and an output node of the ESD protection circuit, and wherein, the secondary protection stage, comprises:
a first high side CMOS transistor and a second high side CMOS-transistor, which are coupled between the output and the first supply voltage and acts as a first secondary rail clamp and
a low side CMOS-transistor, which iscoupled between the output and the second supply voltage and acts as a second secondary rail clamp, wherein
the second high side CMOS-transistor and the low side CMOS-transistor are coupled so as to provide an anti-series connection of Zener diodes between the output node and the first supply voltage and wherein;

the low side CMOS-transistor is coupled so as to provide a Zener diode, which is coupled in forward direction between the output and the second supply voltage and
the high side CMOS-transistor(s) and the low side CMOS-transistor are complementary CMOS-transistors,
wherein a source, a gate and a bulk of the second high side CMOS transistor are coupled substantially directly to the first supply voltage; and
wherein a drain of the second high side CMOS transistor is/are coupled substantially directly to a drain of the first high side CMOS transistor, and
wherein a source of the first high side CMOS transistor is/are coupled substantially directly to a drain of the low side CMOS transistor, and
wherein a bulk of the low side CMOS transistor is substantially directed coupled to the second supply voltage, and
wherein the gate of the first low side MOS transistor is substantially directly coupled to its own drain.

9. The electronic device according to claim 8, wherein the channels of the first and the second high side transistor are coupled in series, and wherein a source, a gate and a bulk of the second high side transistor are coupled to the first supply voltage and a drain of the second high side transistor is coupled to a source and a gate of the first high side transistor, and wherein a drain of the first high side transistor and a drain of the low side transistor are coupled to the output, and wherein a source and a gate of the low side transistor are coupled to the second supply voltage.

10. The electronic device according to claim 9, wherein a bulk of the first high side transistor and a bulk of the low side transistor a coupled to the second supply voltage.

11. The electronic device according to claim 10, wherein the second high side transistor is a PMOS transistor and is coupled to a positive supply voltage as a first supply voltage, the first high side transistor is an NMOS transistor and the low side transistor is an NMOS transistor and is coupled to a negative supply voltage as a second supply voltage.

12. The electronic device according to claim 8, wherein the secondary stage comprises a single high side transistor and a single low side transistor, wherein a source, a gate and a bulk of the high side transistor are coupled to the first supply voltage and a drain of the high side transistor is coupled to a source and a gate of the low side transistor, and wherein a bulk of the low side transistor is coupled to the second supply voltage and the output node is coupled to a drain of the low side transistor.

13. The electronic device according to claim 12, wherein the high side transistor is a PMOS transistor which is coupled to a positive supply voltage as a first supply voltage and the low side transistor is an NMOS transistor which is coupled to a negative supply voltage as a second supply voltage.

14. The electronic device according to claim 13, comprising a first integrated circuit or sub circuit and a second integrated circuit or sub circuit, wherein the input of the ESD protection circuit is coupled to the first integrated circuit or sub circuit and the output of the ESD protection circuit is coupled to the second integrated circuit.

15. An electronic device comprising at least one integrated circuit (IC) and an electrostatic discharge (ESD) protection circuit for failsafe protection of the at least one integrated circuit (IC), the ESD protection circuit comprising:
a primary protection stage having primary power dissipating means including primary power dissipating clamps and a subsequent, secondary protection stage which is coupled to the primary protection stage via a current limiting resistor, wherein a first primary power dissipating clamp is coupled in series between a first supply voltage of the electronic device and an input of the ESD protection circuit and a second primary power dissipating clamp is coupled in series between a second supply voltage of the electronic device and the input of the ESD protection circuit, the protective resistor is coupled in series between the input node and an output node of the ESD protection circuit, and wherein, the secondary protection stage, comprises:
   at least one high side CMOS-transistor, which is coupled between the output and the first supply voltage and acts as a first secondary rail clamp and
   a low side CMOS-transistor, which is coupled between the output and the second supply voltage and acts as a second secondary rail clamp, wherein
   the at least one high side CMOS-transistor and the low side CMOS-transistor are coupled so as to provide an anti-series connection of Zener diodes between the output node and the first supply voltage and wherein;
the low side CMOS-transistor is coupled so as to provide a Zener diode, which is coupled in forward direction between the output and the second supply voltage and
the high side CMOS-transistor(s) and the low side CMOS-transistor are complementary CMOS-transistors,
wherein a source, a gate and a bulk of at least one of the high side transistors are coupled substantially directly to the first supply voltage; and
wherein a drain of the at least one high side transistor is/are coupled substantially directly to a drain of the low side transistor, and
wherein a bulk of the low side transistor is substantially directed coupled to the second supply voltage, and wherein the gate of the low side transistor is substantially directly coupled to its own drain.

16. The electronic device according to claim 15, wherein the channels of the first and the second high side transistor are coupled in series, and wherein a source, a gate and a bulk of the second high side transistor are coupled to the first supply voltage and a drain of the second high side transistor is coupled to a source and a gate of the first high side transistor, and wherein a drain of the first high side transistor and a drain of the low side transistor are coupled to the output, and wherein a source and a gate of the low side transistor are coupled to the second supply voltage.

17. The electronic device according to claim 15, wherein a bulk of the first high side transistor and a bulk of the low side transistor a coupled to the second supply voltage.

18. The electronic device according to claim 15, wherein the second high side transistor is a PMOS transistor and is coupled to a positive supply voltage as a first supply voltage, the first high side transistor is an NMOS transistor and the low side transistor is an NMOS transistor and is coupled to a negative supply voltage as a second supply voltage.

19. The electronic device according to claim 15, wherein the secondary stage comprises a single high side transistor and a single low side transistor, wherein a source, a gate and a bulk of the high side transistor are coupled to the first supply voltage and a drain of the high side transistor is coupled to a source and a gate of the low side transistor, and wherein a bulk of the low side transistor is coupled to the second supply voltage and the output node is coupled to a drain of the low side transistor.

* * * * *